United States Patent [19]

White, Jr.

[11] Patent Number: 4,592,584
[45] Date of Patent: Jun. 3, 1986

[54] ARM REST DEVICE

[76] Inventor: Pierce H. White, Jr., 804 Sampson St., Box 155, Dyersburg, Tenn. 38025-0155

[21] Appl. No.: 609,746

[22] Filed: May 14, 1984

[51] Int. Cl.⁴ .......................... B60J 9/00; B60N 3/00; B68G 5/00
[52] U.S. Cl. .................................. 296/153; 297/227; 297/413; 108/46; 248/118
[58] Field of Search ............................. 296/146, 153; 297/227–229, 411–413, 422; 108/46; 248/118, 118.1

[56] References Cited

U.S. PATENT DOCUMENTS

| | | | |
|---|---|---|---|
| 1,374,907 | 4/1921 | Cofrode | 297/413 |
| 1,426,787 | 8/1922 | Spencer | 296/153 |
| 1,650,385 | 11/1927 | Payton | 296/153 |
| 1,715,862 | 6/1929 | Payton | 297/413 |
| 1,984,855 | 12/1934 | Zwierzina | 296/153 |
| 2,569,436 | 10/1951 | Allen | 296/153 |
| 2,577,561 | 12/1951 | Atwater | 296/153 |
| 2,704,224 | 3/1955 | Banks | 296/153 |
| 2,709,620 | 5/1955 | Tinsley et al. | 296/153 |
| 2,715,544 | 8/1955 | Jones | 296/153 |
| 2,838,340 | 6/1958 | Johnson | 296/153 |
| 2,877,049 | 3/1959 | Lucas | 296/153 |
| 2,948,565 | 8/1960 | Johnson | 296/153 |
| 2,949,334 | 8/1960 | Amerpohl | 108/46 |
| 2,987,343 | 6/1961 | Stern | 296/153 |
| 3,202,116 | 8/1965 | Wilson | 108/46 |
| 3,603,637 | 9/1971 | De Pinto | 296/153 |
| 3,634,925 | 1/1972 | Van Loo | 297/227 |

FOREIGN PATENT DOCUMENTS

| | | |
|---|---|---|
| 1016138 | 11/1952 | France . |
| 1068022 | 6/1954 | France . |
| 1127547 | 12/1956 | France . |
| 2230185 | 12/1974 | France . |
| 2497739 | 7/1982 | France . |
| 716945 | 10/1966 | Italy . |

OTHER PUBLICATIONS

Popular Science, Jul. 1957, p. 109.

Primary Examiner—Robert B. Reeves
Assistant Examiner—Dennis H. Pedder
Attorney, Agent, or Firm—Mason, Fenwick & Lawrence

[57] ABSTRACT

An arm rest device is disclosed for removable and adjustable attachment to a window well formed by a panel of an automobile or the like. The panel has an upper, horizontally disposed windowsill, which has an opening passing into the window well and an inside, vertically disposed surface. The arm rest device comprises a horizontally disposed support member and a vertically disposed tongue connected to the support member to form a substantially T-shaped device. A lip extends vertically downward from and is connected to the support member. The lip is spaced from the tongue a distance to permit the lip to be inserted through the window opening and into the window well and the tongue to extend along the inside, vertically disposed surface, whereby the arm rest device is releasably retained on the automobile panel.

8 Claims, 3 Drawing Figures

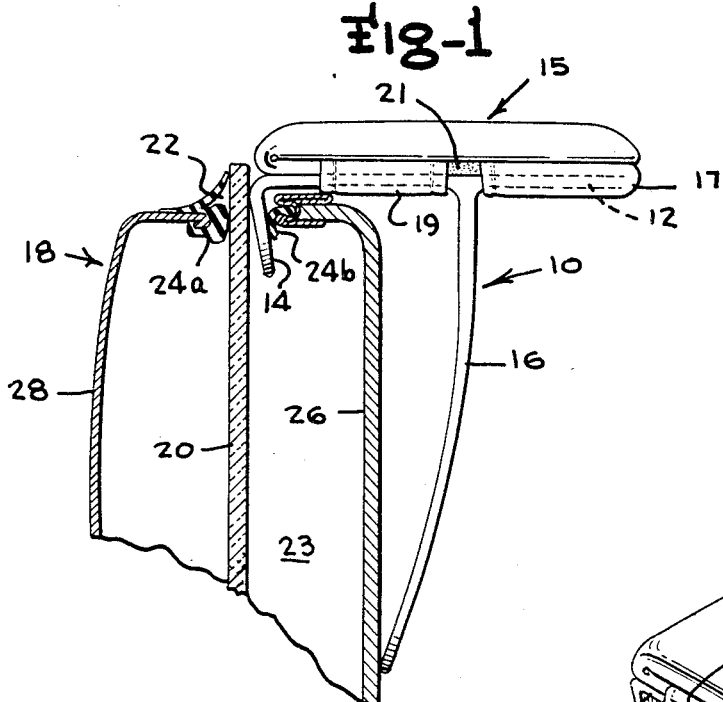
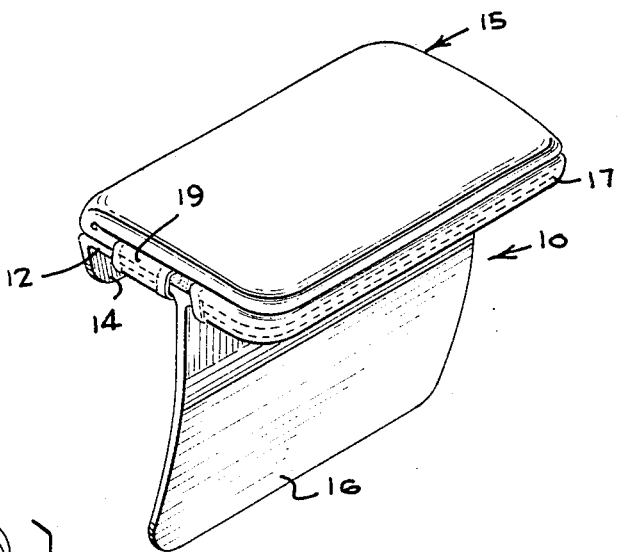
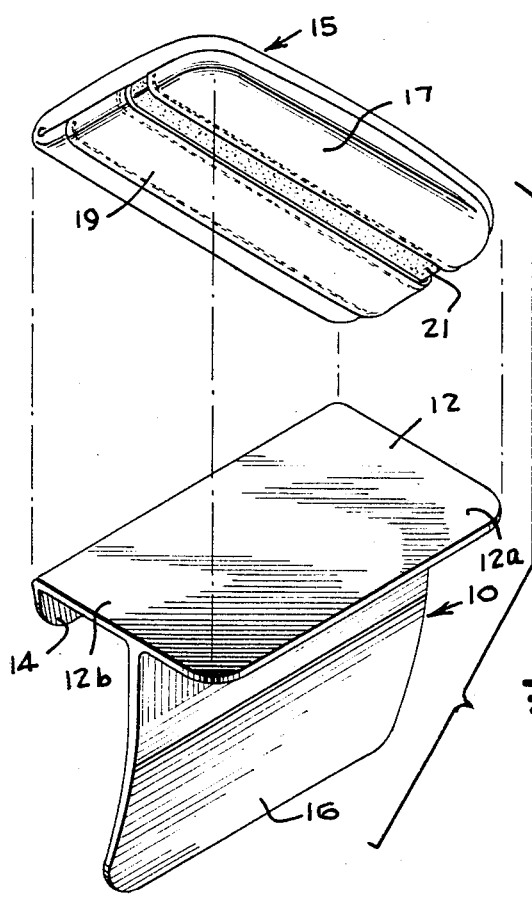

ARM REST DEVICE

BACKGROUND OF THE INVENTION

1. Field of the Invention

This invention relates to arm rest devices adapted to be removably mounted on a panel of an automobile or the like to permit either the driver or passenger to rest his/her arm thereon.

2. Description of the Prior Art

Arm rest devices are well-known in the art to be removably attached from the door of an automobile, whereby the driver or passenger of an automobile may rest his/her arm thereon. U.S. Pat. No. 1,426,787 of Spencer and U.S. Pat. No. 3,603,637 of DePinto disclose arm rest devices being adapted to be attached from the window well of an automobile. Each of the DePinto and Spencer devices is equipped with a plurality of brackets having a curved portion adapted to be fitted over the window well of an automobile. In particular, DePinto discloses that his brackets include outturned portions having a downturn portion 12 adapted to be fitted in the window opening or slot of an automobile door. Each of the arm rest devices of the DePinto and Spencer patents is constructed to be readily removable from the side door of the automobile. Further, each of the Spencer and DePinto devices have a support member for receiving a padded or upholstered material, upon which the arm may rest.

The arm rest devices of the prior art typically extend into the automobile compartment and are mounted to extend from the inside panel of the door. As a result, the support member must be of relatively large configuration to provide sufficient area upon which the rider/driver may rest his/her arm. In compact cars, this extension into the interior space of the automobile may be a problem. Such prior art arm rest devices also do not cover the windowsill, which is, typically, a rather uncomfortable place upon which to rest one's arm.

SUMMARY OF THE INVENTION

It is an object of this invention to provide a relatively compact arm support rest device.

It is a further object of this invention to provide a new and improved arm rest device adapted to be removably inserted upon the windowsill of an automobile door, whereby an extended area is provided for supporting the arm of a driver or passenger of the automobile.

It is a still further object of this invention to provide a new and improved arm rest that may be mounted upon the windowsill of an automobile door even if its window is fully extended.

It is another object of this invention to provide a new and improved arm rest device that is mounted upon the window sill of an automobile door in a manner which allows the arm of the driver or passenger to rest directly over the window sill on a smooth or cushioned resting place.

It is another object of this invention to provide a new and improved arm rest device that is mounted upon the windowsill of an automobile door in a manner to prevent the arm of a driver or passenger from resting directly onto the windowsill.

In accordance with these and other objects of this invention, there is disclosed an arm rest device for removable and adjustable attachment to a panel of an automobile or the like. The panel has an upper, horizontally disposed windowsill which has a window opening passing into a window well formed within the panel and an inside, vertically disposed surface. The arm rest device comprises a horizontally disposed support member and a vertically disposed tongue connected to the support member to form a substantially T-shaped device. A lip extends vertically downward from and is connected to the support member. The lip is spaced from the tongue a distance to permit the lip to be inserted through the window opening and into the window well and the tongue to extend along the inside, vertically disposed surface, whereby the arm rest device is releasably retained on the automobile panel.

DESCRIPTION OF THE DRAWINGS

A detailed description of a preferred embodiment of this invention is hereafter made with specific reference being made to the drawings in which:

FIG. 1 is a side view of a T-shaped arm rest device constructed in accordance with the teachings of this invention and mounted upon the windowsill of an automobile side door, shown in section;

FIG. 2 is a perspective view of the arm rest device shown in FIG. 1 with a padded member secured thereto; and FIG. 3 is an exploded, perspective view of the arm rest device shown in FIGS. 1 and 2 illustrating the manner in which a preferred embodiment of the padded member is secured to the T-shaped arm rest device.

DESCRIPTION OF THE PREFERRED EMBODIMENT

Referring now to the drawings and, in particular, to FIG. 1, there is shown a T-shaped arm rest device 10 in accordance with the teachings of this invention. As illustrated in FIG. 1, the arm rest device 10 is adapted to be readily mounted on a windowsill 18. The windowsill 18 is illustrated in FIG. 1 as a sectioned view and is a part of a side door or panel of an automobile. The windowsill 18 has a window opening 22 disposed along a top edge of the automobile door, whereby a window 20 may be readily raised and lowered from a window well 23 formed within the car door. The window opening 22 has a pair of seals 24a and 24b, one seal disposed on either side of the window opening 22. The pair of seals 24a and 24b effectively engage and seal with the window 20 to prevent moisture from leaking into the window well 23. The window well 23 receives the window 20 and is formed by an outside car panel 28 and an inside car panel 26.

The T-shaped arm rest device 10 includes a vertically disposed, extended tongue 16 and a horizontally disposed arm support member 12, which are connected to each other to form a T. At one extremity of the arm support member 12, there is connected a vertically disposed retaining lip 14. The retaining lip 14 is particularly adapted to be disposed within the window opening 22, whereby the arm rest device 10 is supported upon the windowsill 18. The spacing between the retaining lip 14 and the extended tongue 16 is selected so that the arm rest device 10 may be mounted on windowsills of most automobiles.

Further, the extended tongue 16 is preferably curved, so that when the arm rest device 10 is mounted upon the windowsill 18 the extended curved tongue flexibly biases its lower-most end against the car side panel 26 to provide more support against the car side panel 26.

When so mounted, the flexible tongue forms, along its lower portion, a concave surface toward the side panel 26 and only the tip of tongue 16 rests on the side panel. The entire tongue length is effectively used, as a result, as a spring. It is also contemplated that the tongue 16 may be of a straight configuration. In this regard, the arm rest device 10 may be formed or molded of a suitable, flexible, plastic material such as polypropylene. A arm rest device made of such a plastic material is relatively economical to manufacture, light weight, durable, and flexible. As indicated above, the flexibility imparted by molding of a plastic material serves to retain the arm rest device 10 upon the door sill 18, as well as to allow for greater comfort for the driver's or passenger's arm. A padded member 15 is secured to the top surface of the arm support member 12 to provide a soft, comfortable surface for receiving the arm of the driver/passenger. It is contemplated that the arm rest device 10 of this invention may be used without the padded member 15 and still provide comfortable support.

In a preferred embodiment of this invention, the padded member 15 includes a rectanglar shaped resilient member 21 that is covered with a durable fabric. In order to permit the padded member 15 to be readily removed from the arm rest device 10, an enclosed pocket 17 is disposed along one edge of the padded member 15. A band 19 is disposed rearwardly of the enclosed pocket 17. As shown in FIG. 3, the arm support member 12 of the arm rest device 10 has a leading portion 12a and a trailing portion 12b divided by the extended tongue 16. As shown in FIGS. 1 and 3, the enclosed pocket 17 is configured and dimensioned to receive the leading portion 12a, whereas the band 19 is connected at its end to the padded member 15 and dimensioned to be disposed about the trailing portion 12b.

In order to assemble the padded member 15 on the arm support member 12, the band 19 is slipped about the retaining lip 14 and, thereafter, the padded member 15 is disposed as far forward as possible over the leading portion 12a. In that position, the enclosed pocket 17 is readily slipped over the leading portion 12a. The rounding of the corners on the leading portion 12a facilitates its insertion into the enclosed pocket 17. In a further embodiment of this invention, it is contemplated that the padded member 15 may be secured by adhesive to the pouch surface of the arm support member 12.

The arm rest device of this invention rests upon the windowsill in a manner to prevent the arm of a passenger or driver from directly resting upon the windowsill. Further, the arm rest device described above is positioned to comfortably receive the arm of a passenger or driver and, yet, not extend unduly into the interior space of the automobile. The arm rest device of this invention provides a support surface beginning at the window and covering the window sill. In compact cars, this feature allows more complete use of interior space of the automobile and would allows someone to rest his/her arm comfortably over the window sill even if the window is raised. Further, the arm rest device of this invention may be mounted upon the windowsill of an automobile even if its window is raised. Further, the arm rest of this invention is capable of being variably mounted along the length of the window opening, permitting adjustment for the comfort and size of its drivers and passengers.

In considering this invention, it should be remembered that the present disclosure is illustrative only and the scope of the invention should be determined by the appended claims.

I claim:

1. An arm rest device for removable and adjustable attachment to a window well formed by a panel of an automobile or the like, said panel having an upper, horizontally disposed windowsill, the windowsill having an opening passing into the window well and an inside, vertically disposed surface, said arm rest device comprising:
   (a) a horizontally disposed planar support member for providing a continuous, substantially planar support surface;
   (b) a vertically disposed bowed tongue connected to said support member to form a substantially T-shaped device and to divide said support member into a leading portion and a trailing portion;
   (c) a lip extending generally vertically downward from and connected to said trailing portion of said support member, said lip being spaced from said tongue a distance to permit said lip to be inserted through the opening and into the window well, said tongue extending along the inside vertically disposed surface and said trailing portion overlying at least a portion of the windowsill, whereby said arm rest device is releasably retained on the automobile panel, said leading portion extending from the windowsill into the interior of the automobile and said support surface extends over the windowsill to provide an extended arm rest area, said tongue has an end portion curved toward said lip to form a concave surface toward said inside surface, said tongue being of a length greater than that of said lip, wherein the tip of the end portion rests upon the inside surface to provide a maximum spring length and corresponding spring action when an arm is rested upon said support surface.

2. The arm rest device as claimed in claim 1, wherein there is further included a padded member of similar configuration as and connected to the upper surface of said horizontally disposed support member.

3. The arm rest device as claimed in claim 1, wherein said arm rest device is made of a flexible material.

4. The arm rest device as claimed in claim 3, wherein said support member, said tongue, and said lip are integrally formed with each other.

5. The arm rest device as claimed in claim 4, wherein said support member, said tongue, and said lip are formed by molding of a suitable plastic material.

6. The arm rest device as claimed in claim 5, wherein said material is polypropylene.

7. The arm rest device as claimed in claim 1, wherein said horizontally disposed support member provides a support surface extending from said lip into the interior of the automobile.

8. The arm rest device as claimed in claim 2, wherein said trailing portion extends from said tongue to said lip and said leading portion extends from said tongue to a leading edge thereof, and said padded member comprises an enclosed pocket of a configuration and dimension to receive said leading portion, and a band spaced from said enclosed pocket a distance and configured to be disposed about said trailing portion to thereby retain said padded member to said support member.

* * * * *